United States Patent
Thomas et al.

(10) Patent No.: US 11,727,033 B1
(45) Date of Patent: *Aug. 15, 2023

(54) SYSTEM AND METHOD FOR UPDATING CRM DATA

(71) Applicant: Veeva Systems Inc., Pleasanton, CA (US)

(72) Inventors: Benjamin Steven Thomas, Richmond, VA (US); Povilas Petkevicius, Barcelona (ES); Ryan Andrew Brennan, Glenmoore, PA (US)

(73) Assignee: Veeva Systems Inc., Pleasanton, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/092,127

(22) Filed: Nov. 6, 2020

(51) Int. Cl.
*G06F 16/26* (2019.01)
*G06F 16/23* (2019.01)
*G06F 16/28* (2019.01)

(52) U.S. Cl.
CPC ............ *G06F 16/26* (2019.01); *G06F 16/235* (2019.01); *G06F 16/2365* (2019.01); *G06F 16/287* (2019.01)

(58) Field of Classification Search
None
See application file for complete search history.

(56) References Cited

U.S. PATENT DOCUMENTS

| | | | |
|---|---|---|---|
| 2003/0033212 A1* | 2/2003 | Sandhu | G06Q 40/06 705/26.1 |
| 2012/0014260 A1* | 1/2012 | Enomoto | H04L 45/22 370/241.1 |
| 2012/0059906 A1* | 3/2012 | Ciancio-Bunch | G06F 16/245 709/217 |
| 2014/0013246 A1* | 1/2014 | Beechuk | G06Q 50/01 715/753 |
| 2019/0122225 A1* | 4/2019 | Sosna | G06Q 30/016 |
| 2019/0243621 A1* | 8/2019 | Gass | G06F 8/425 |
| 2019/0340109 A1* | 11/2019 | Barron-Kraus | G06F 11/3664 |
| 2020/0004872 A1* | 1/2020 | Dilts | G06F 16/26 |
| 2021/0014260 A1* | 1/2021 | Singh | H04L 41/16 |
| 2021/0150604 A1* | 5/2021 | Ghorbani | G06Q 30/0201 |
| 2021/0211294 A1* | 7/2021 | Ferrington | H04L 9/3236 |

* cited by examiner

*Primary Examiner* — Wilson Lee

(57) ABSTRACT

Systems and methods for presenting CRM data. Users may configure what to display on a custom report and how to arrange and display the content (e.g., size, color, theme), so that they can visualize the CRM data the way they want. A data visualization interface may be used to generate the custom report, and may use HTML to specify the CRM data to be displayed and their location on the custom report according to user configuration. The data visualization interface may use JavaScript for specifying the objects and fields users want to query to obtain the CRM data to fill up the custom report. An API may communicate with the JavaScript in the data visualization interface and then query data and objects in the CRM to get a result set. The API may be a unified API which may work across multiple platforms and query various types of database, e.g., iOS, Windows, and the browser for Salesforce online. Users may edit the CRM data displayed in the custom report.

26 Claims, 21 Drawing Sheets

KOL Profile                                                                 Done Alexander, Richard Position: Senior Physician
Specialty: Thoracic Oncology Institution: Wells Medical Center
Address: 200 48th Street, Suite 1600
Sacramento, CA 92115
Phone: 1+ 855-600-0000
Email: ralexander@udmc.com

Career History »

Wells Medical Center
Primary Position: Senior Physician
Institution: UC Davis Medical Center

- ⑧ Hospitals
- ② Professorships
- ① Department Head
- ③ Universities
- ⑤ Advisory Boards
- ④ Others

Affiliations »

23
Total Affiliations

- ⑧ Hospitals
- ② Professionals
- ① Practice
- ③ Institutions
- ⑤ Boards
- ④ Others

Expertise »

Stroke: ▓▒░ 10

Company Collaboration »

My Company: ▓▒░ Neutral — Strong

| Back | | | |
|---|---|---|---|
| Edit | Antonucci, Rose | | |
| Record a Call | Name Rose Antonucci | Gender | F |
| Launch Media | Middle A | Credentials | MD |
| New Medical Inquiry | Suffix | Specialty | Cardiology |
| Send Email | Preferred Name Dr. A | Specialty 2 | General Practice |
| Consent Capture | Status | Primary Parent | Not Available |
| New Order | Order Type Alt, Transfer | Language | English |
| Account Summary | Default Order Type | Territory | View |
| Custom Reports | | | |
| View Hierarchy | My Account Info | | |
| Calendar | 1107 | | |
| Sphere of Influence | My Detailing Priority ☐ | Day Since Last Call | 14 |
| Addresses (2) | My Preferred Address 400 Route 2A Suite E | My Last Activity Date | 7/3/2017 |
| Customer Interactions (27) | My Preferred Location | My YTD Activity | 29 |
| Call Samples (2) | | Allowed Product | ⑦ |
| Multichannel Activities (9) | Key Indicators | | |
| Last Update: 7/17/2017, 10:33 AM | Preferred Statin Zostatin | Call Frequency | 24 |

SYSTEM AND METHOD FOR UPDATING CRM DATA

BACKGROUND

The subject technology relates generally to data processing, and more specifically to updating customer relationship management ("CRM") data.

CRM and other data storage systems are widely used to manage data for various type of organizations ("customer"). User interfaces of the data management systems usually have a number of fields, e.g., a field for a doctor's name, and a field for the doctor's phone number. Such user interfaces are convenient for data entry, but not convenient for users to understand and use the data. Thus, it is desirable to provide a system and method for visualizing the data so that it is easier for users to understand it.

SUMMARY

The disclosed subject matter relates to a method for displaying data from a data storage system. The method comprises: enabling generation of a data visualization interface for rendering a first custom report according to previously received user configuration. The user configuration comprises a first type of data to be displayed at a first location on the first custom report and a second type of data to be displayed at a second location on the first custom report. The first type of data and the second type of data are obtained from the data storage system. The data visualization interface comprises instructions in a markup language for specifying the first type of data, the first location, the second type of data, and the second location, and instructions in a second programing language for obtaining the first type of data and the second type of data from the data storage system. The method further comprises: receiving instructions in the second programing language from the data visualization interface at an application programming interface ("API"); sending an API call to the data storage system to obtain the first type of data and the second type of data; receiving the first type of data and the second type of data at the data visualization interface; rendering the first custom report based on the first type of data, the first location, the second type of data and the second location; displaying the first custom report; receiving new data and storing the new data in a memory device; and updating the first customer report with the new data from the memory device before the new data is saved to the data storage system; and receiving a request for editing the first type of data from the data storage system.

BRIEF DESCRIPTION OF THE DRAWINGS

FIG. 8 to FIG. 13 each illustrates an example custom report according to one embodiment of the present invention.

FIG. 14 illustrates an example of a traditional CRM account screen.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, well-known structures and components are shown in block diagram form in order to avoid obscuring the concepts of the subject technology.

Figure 1:
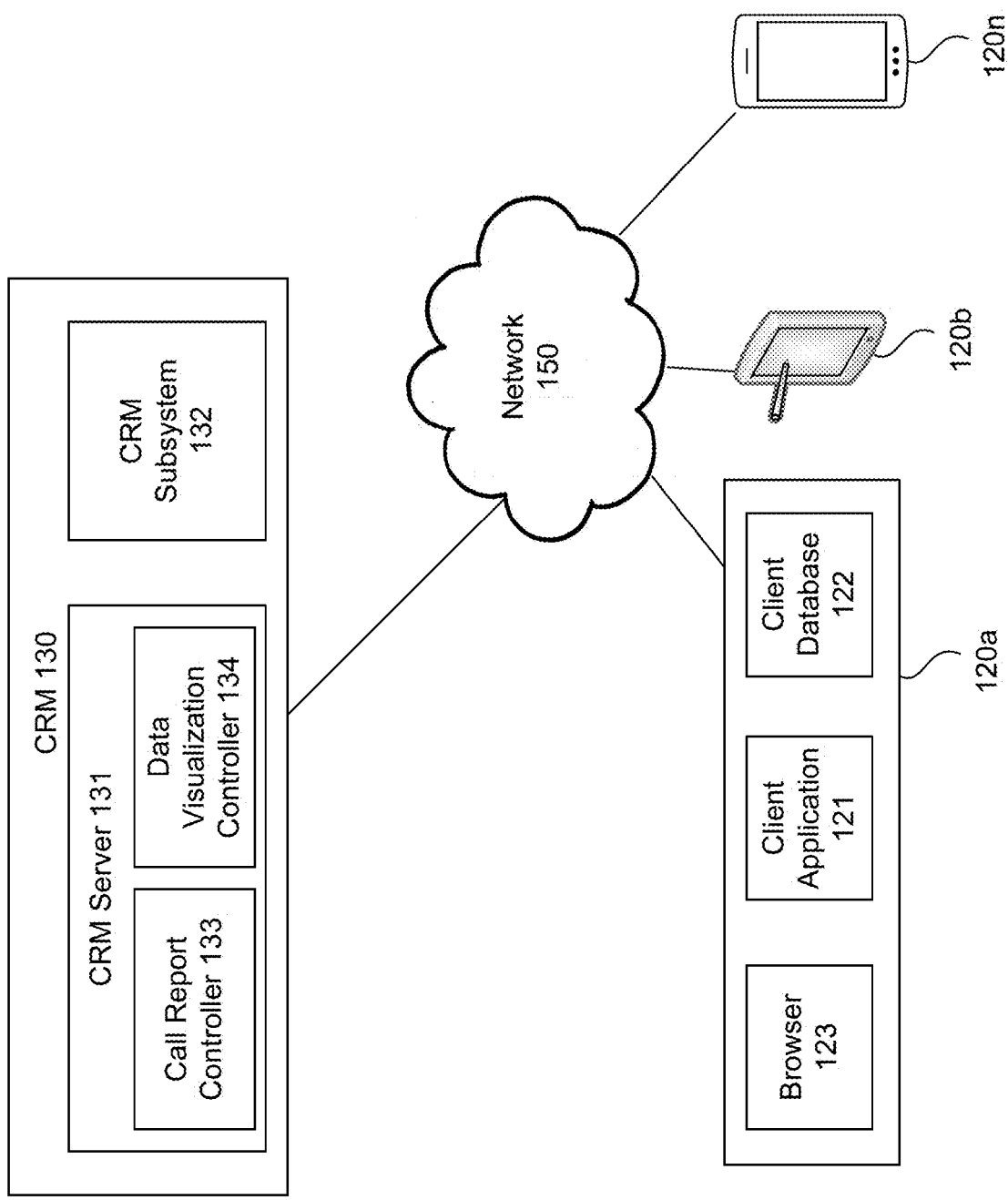
FIG. 1 illustrates an example high level block diagram of a customer relationship management architecture wherein the present invention may be implemented.

FIG. 1 illustrates an example high level block diagram of a customer relationship management architecture 100 wherein the present invention may be implemented. As shown, the architecture 100 may include a plurality of user computing devices 120a, 120b, . . . 120n, and a CRM 130, coupled to each other via a network 150. The CRM 130 may include a customer relationship management server 131, and a customer relationship management subsystem 132. The customer relationship management server 131 may further include a call report controller 133 and a data visualization controller 134. The network 150 may include one or more types of communication networks, e.g., a local area network ("LAN"), a wide area network ("WAN"), an intra-network, an inter-network (e.g., the Internet), a telecommunication network, and peer-to-peer networks (e.g., ad hoc peer-to-peer networks), which may be wired or wireless.

The user computing devices 120a-120n may be any machine or system that is used by a user to access the CRM 130 via the network 150, and may be any commercially available computing devices including laptop computers, desktop computers, mobile phones, smart phones, tablet computers, netbooks, and personal digital assistants (PDAs). A CRM client application 121 may run from a user computing device, e.g., 120a, and access the CRM 130 via the network 150. A client database 122 for the client application 121 may store a subset of data from the database system 110 which may be needed to support the operation of the client application 121. The client database 122 may be synchronized with the database system 130 regularly, when the user computing device is back online, and/or when the user requests for synchronization. User computing devices 120a-120n are illustrated in more detail in FIG. 3.

The customer relationship management server 131 is typically a remote computer system accessible over a remote or local network, such as the network 150, and may provide access to the customer relationship management subsystem 132. The customer relationship management server 131 could be any commercially available computing devices. A client application (e.g., 121) process may be active on one or more user computing devices 120a-120n. The corresponding server process may be active on the customer relationship management server 131. The client application process and the corresponding server process may communicate with each other over the network 150, thus providing distributed functionality and allowing multiple client applications to take advantage of the information-gathering capabilities of the CRM 130.

Figure 5:
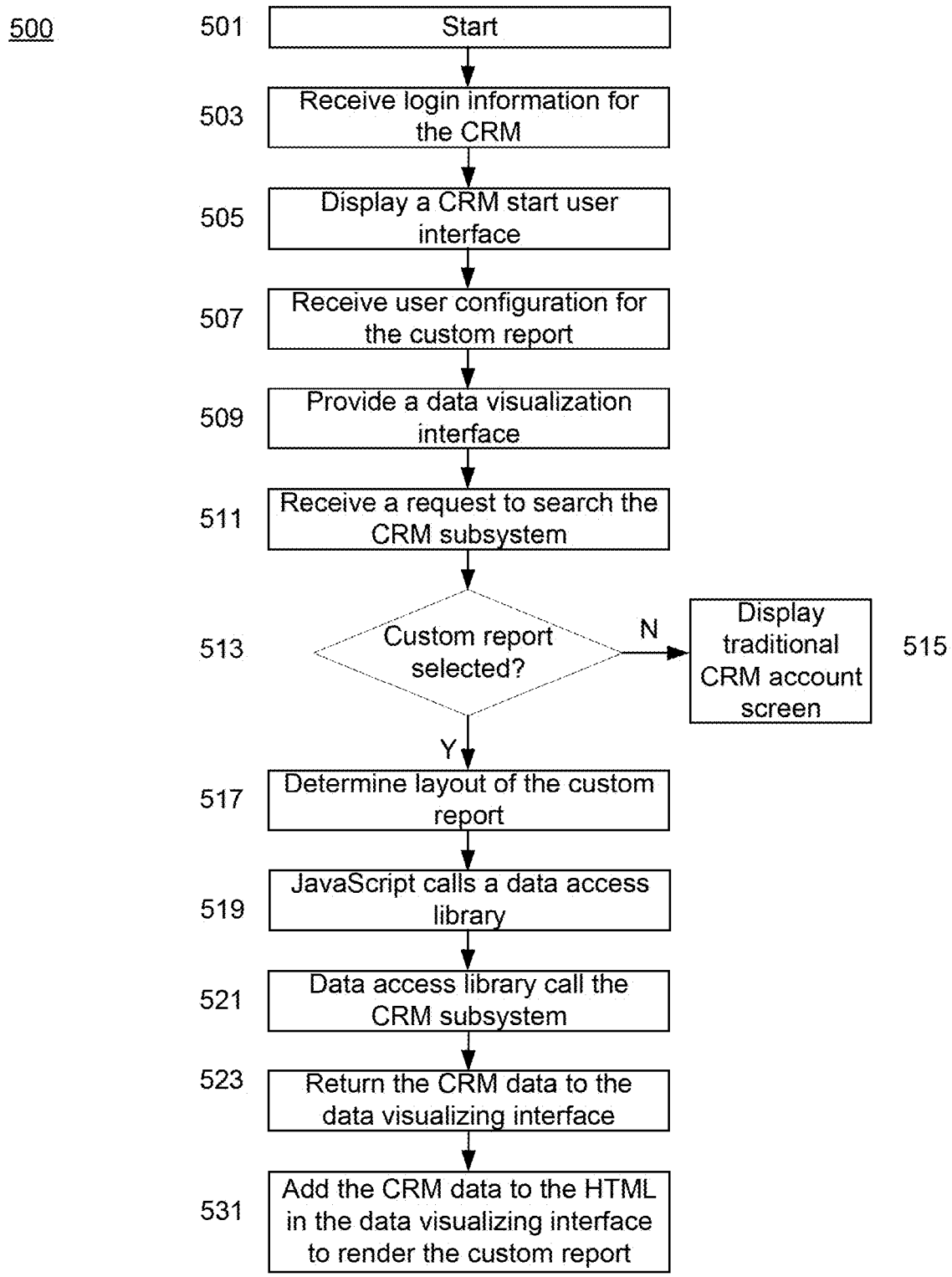
FIG. 5 illustrates an example flowchart of a method for displaying data from a data storage system according to one embodiment of the present invention.

In one implementation, the call report controller 133 in the customer relationship management server 131 may control the process for generating a call report, e.g., for recording the interactions between a sales representative of a pharmaceutical company and a doctor, and the data visualization controller 134 in the customer relationship management server 131 may control the process for visualizing data from the customer relationship management subsystem 132, as will be described with reference to FIG. 5 below.

Although the call report controller 133 and the data visualization controller 134 are shown in one server, it should be understood that they may be implemented in multiple servers.

In one implementation, the customer relationship management subsystem 132 stores contact information that may be available to users. In addition to contact information, the customer relationship management subsystem 132 can also store configurations regarding specific preferences, regulatory limitations and requirements, sales data and other fields that will facilitate communications, in general or on a by-recipient basis.

In one implementation, the customer relationship management subsystem 132 can communicate with multiple sources through the customer relationship management server 131 or through other channels to maintain a current and accurate collection of information regarding customer accounts, which may include group accounts and individual accounts. The interface with the multiple sources can be, for example, through an Application Programming Interface or API, as the API interface will allow compatibility with a flexible array of third-party provider servers. The information being updated may include, but is not limited to, licensing information, area of practice, and location of the various customer accounts. In this manner, the customer relationship management subsystem 132 pulls the approved version of what represents an account, which may be a hospital or physician, and pulls from multiple networks to ensure that the information regarding an account is up-to-date.

In one implementation, the customer relationship management subsystem 132 may be operated by a third party.

In one implementation, the CRM 130 may be a multi-tenant system where various elements of hardware and software may be shared by one or more customers. For instance, a server may simultaneously process requests from a plurality of customers. In a multi-tenant system, a user is typically associated with a particular customer. In one example, a user could be an employee of one of a number of pharmaceutical companies which are tenants, or customers, of the CRM 130.

Although the embodiments are described with a customer relationship management subsystem 132, the customer information and content may be from other types of information management systems, e.g., a Closed Loop Marketing (CLM) system. Other types of data storage systems may be used as well.

In one embodiment, the CRM 130 may run on a cloud computing platform. Users can access content on the cloud independently by using a virtual machine image, or purchasing access to a service maintained by a cloud database provider. The customer relationship management subsystem 132 may be a cloud-based customer database that provides a central access to store and distribute consistent data across customer companies as well as their possible third-party partners and agencies that are used to keep this data updated. This system can provide standard data formats and provide an easy and automated way for customers to have access to coordinated and frequently updated CRM data.

In one embodiment, the CRM 130 may be provided as Software as a Service ("SaaS") to allow users to access it with a thin client.

Figure 2:
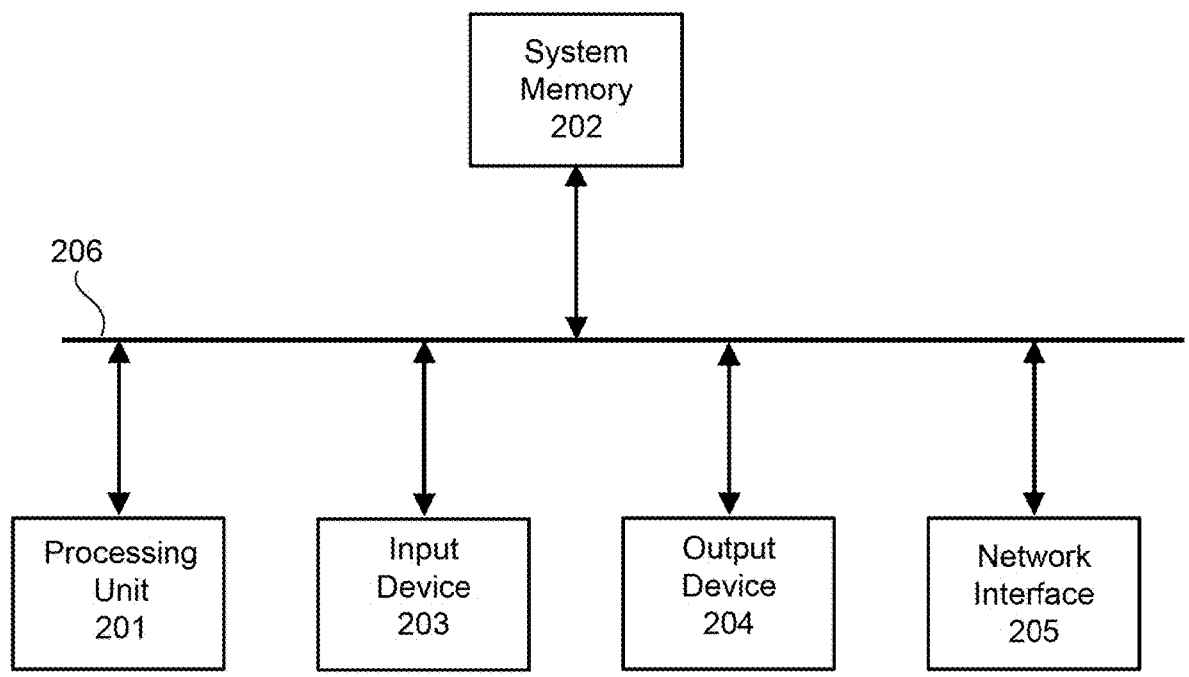
FIG. 2 illustrates an example block diagram of a computing device.

FIG. 2 illustrates an example block diagram of a computing device 200 which can be used as the user computing devices 120a-120n, and the customer management relationship server 131 in FIG. 1. The computing device 200 is only one example of a suitable computing environment and is not intended to suggest any limitation as to scope of use or functionality. The computing device 200 may include a processing unit 201, a system memory 202, an input device 203, an output device 204, a network interface 205 and a system bus 206 that couples these components to each other.

The processing unit 201 may be configured to execute computer instructions that are stored in a computer-readable medium, for example, the system memory 202. The processing unit 201 may be a central processing unit (CPU).

The system memory 202 typically includes a variety of computer readable media which may be any available media accessible by the processing unit 201. For instance, the system memory 202 may include computer storage media in the form of volatile and/or nonvolatile memory such as read only memory (ROM) and/or random access memory (RAM). By way of example, but not limitation, the system memory 202 may store instructions and data, e.g., an operating system, program modules, various application programs, and program data.

A user can enter commands and information to the computing device 200 through the input device 203. The input device 203 may be, e.g., a keyboard, a touchscreen input device, a touch pad, a mouse, a microphone, and/or a pen.

The computing device 200 may provide its output via the output device 204 which may be, e.g., a monitor or other type of display device, a speaker, or a printer.

The computing device 200, through the network interface 205, may operate in a networked or distributed environment using logical connections to one or more other computing devices, which may be a personal computer, a server, a router, a network PC, a peer device, a smart phone, or any other media consumption or transmission device, and may include any or all of the elements described above. The logical connections may include a network (e.g., the network 150) and/or buses. The network interface 205 may be configured to allow the computing device 200 to transmit and receive data in a network, for example, the network 150. The network interface 205 may include one or more network interface cards (NICs).

Figure 3:
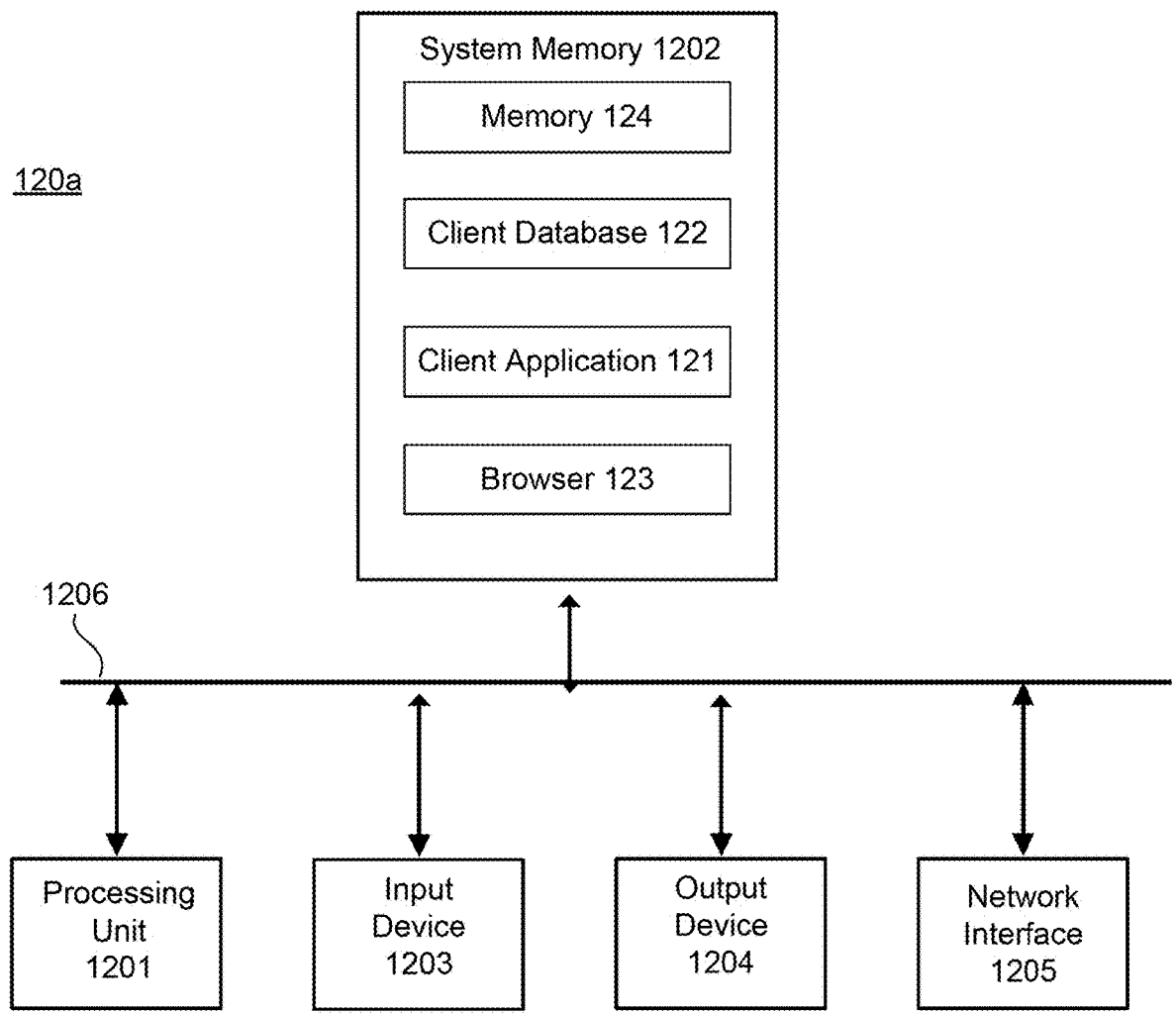
FIG. 3 illustrates an example high level block diagram of a user computing device.

FIG. 3 illustrates an example high level block diagram of a user computing device (e.g., 120a) wherein the present invention may be implemented. The user computing device 120a may be implemented by the computing device 200 described above, and may have a processing unit 1201, a system memory 1202, an input device 1203, an output device 1204, and a network interface 1205, coupled to each other via a system bus 1206. The client application 121 and the client database 122 may be stored in the system memory 1202. In one embodiment, the client database 122 may be maintained in a local store, e.g., a hard disk, relational store, cache memory, etc. The client application 121 may have a client data visualization controller 123 and the system memory 1202 may include a memory 124 for temporally storing new data. The client database may be a subset of data in the CRM subsystem 132 that the user is authorized to access. The system memory 1202 may also store a browser 123 for directly interacting with the CRM 130.

Figure 4:
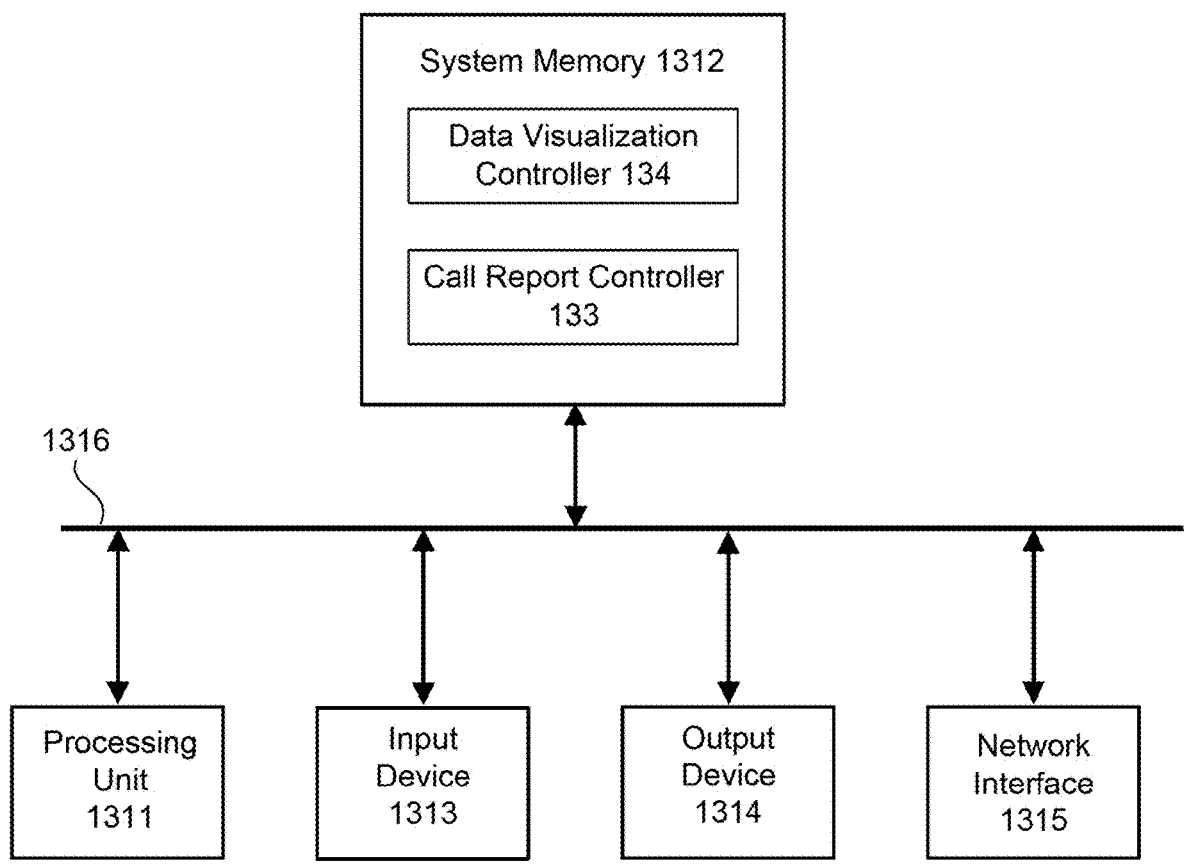
FIG. 4 illustrates an example high level block diagram of the customer relationship management server according to one embodiment of the present invention.

FIG. 4 illustrates an example high level block diagram of the customer relationship management server 131 according to one embodiment of the present invention. The customer relationship management server 131 may be implemented by the computing device 200, and may have a processing unit 1311, a system memory 1312, an input device 1313, an output device 1314, and a network interface 1315, coupled to each other via a system bus 1316. The system memory 1312 may store the call report controller 133 and the data visualization controller 134.

The present invention allows users to configure what to display on a custom report and how to arrange and display the content (e.g., size, color, theme) on the custom report, so that they can visualize the CRM data the way they want. A data visualization interface may be used to generate the custom report, and may have code in a markup language for describing and defining the content of the custom report. One example of the markup language is HyperText Markup Language ("HTML"), and the HTML code may specify the CRM data to be displayed and their location on the custom report according to user configuration. The data visualization interface may also have code in a programing language for describing the custom report's functionality, which may be, e.g., JavaScript code for specifying the objects and fields users want to query to obtain the CRM data to fill up the custom report. The CRM data is returned to the data visualization interface in JSON format. The JavaScript code may place the CRM data at the right place on the custom report, using the HTML to display the custom report.

Users may modify the objects and fields they like to query using the JavaScript. The data visualization interface could be a webpage, iFrame, or Webview.

The present invention provides an application programing interface ("API") which may communicate with the JavaScript in the data visualization interface and then query data and objects in the CRM subsystem 132 to get a result set.

In one implementation, the API may be a unified API which may query various types of data sources across multiple platforms, e.g., iOS, Windows, and the browser for Salesforce online. What a user frequently queries (e.g., the last five calls, most recent calls or all calls submitted) may be packaged up in well formed API calls. The JavaScript may communicate with the API only, and does not have to care about the type of the actual database to be queried.

FIG. 5 illustrates an example flowchart of a method for visualizing data from a CRM system according to one embodiment of the present invention. The process may start at 501.

At 503, a user may login to the CRM 130.

At 505, a start user interface for the CRM 130 may be displayed in response, by the CRM server 131.

Figure 8:
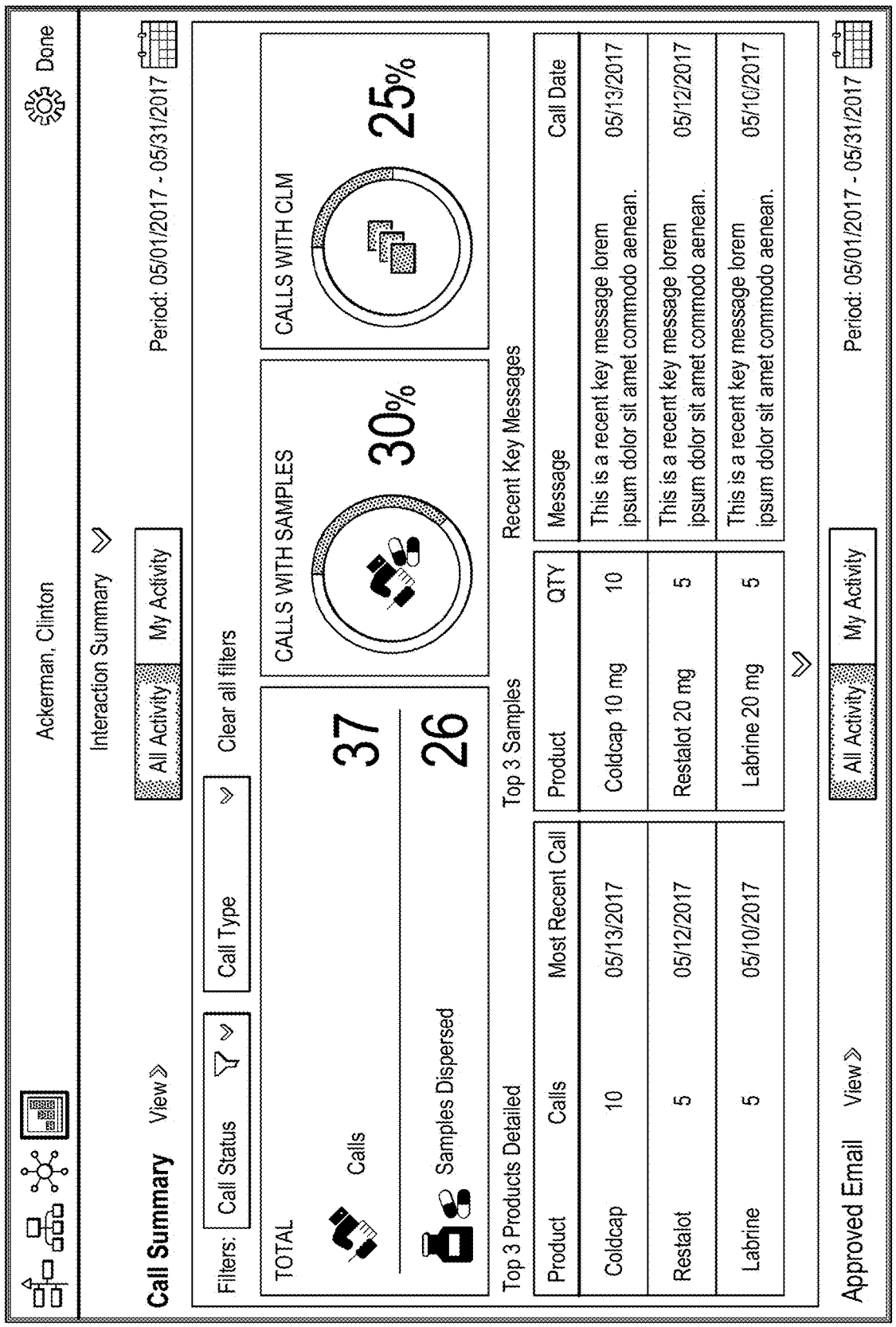
Figure 9A:
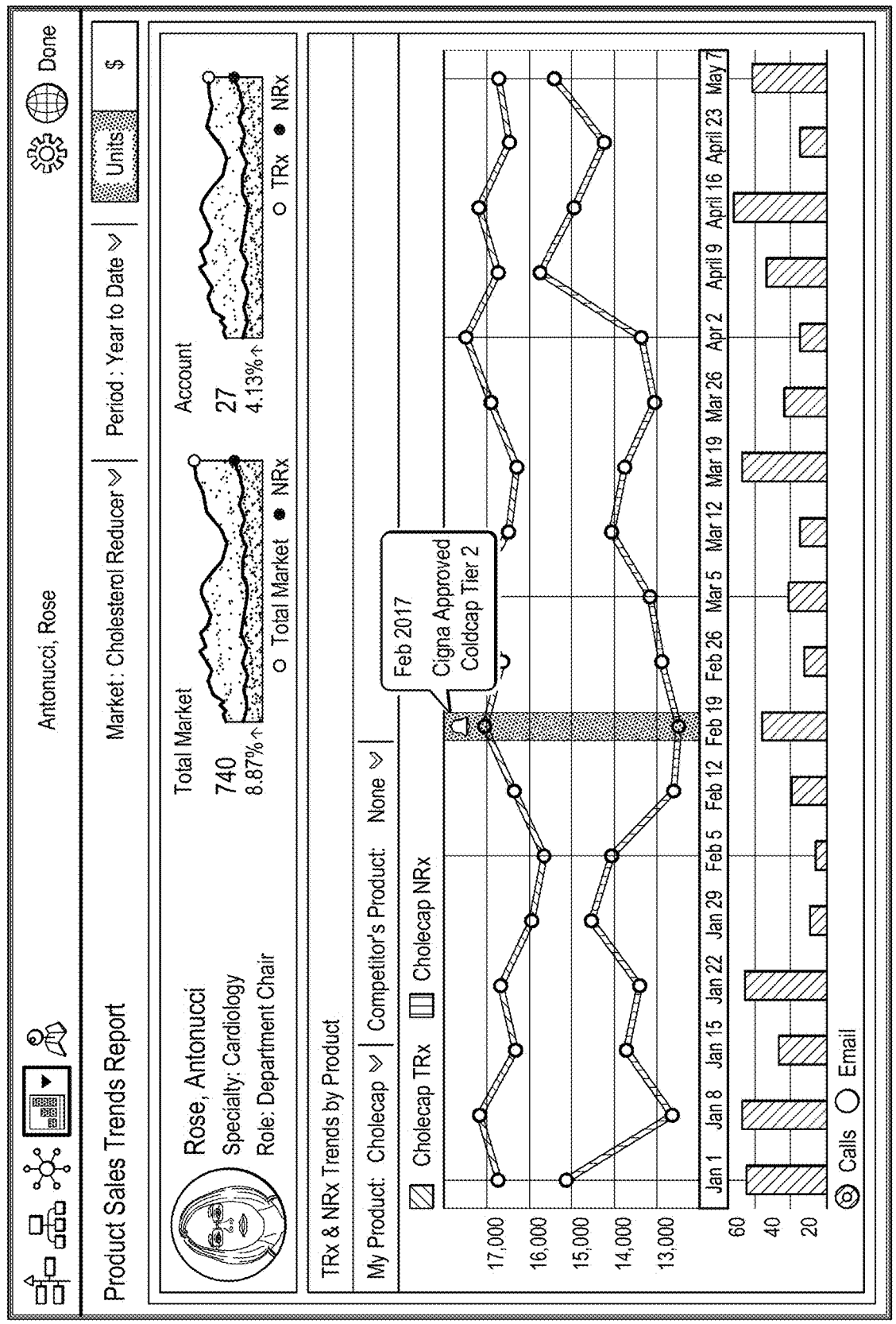
Figure 9B:
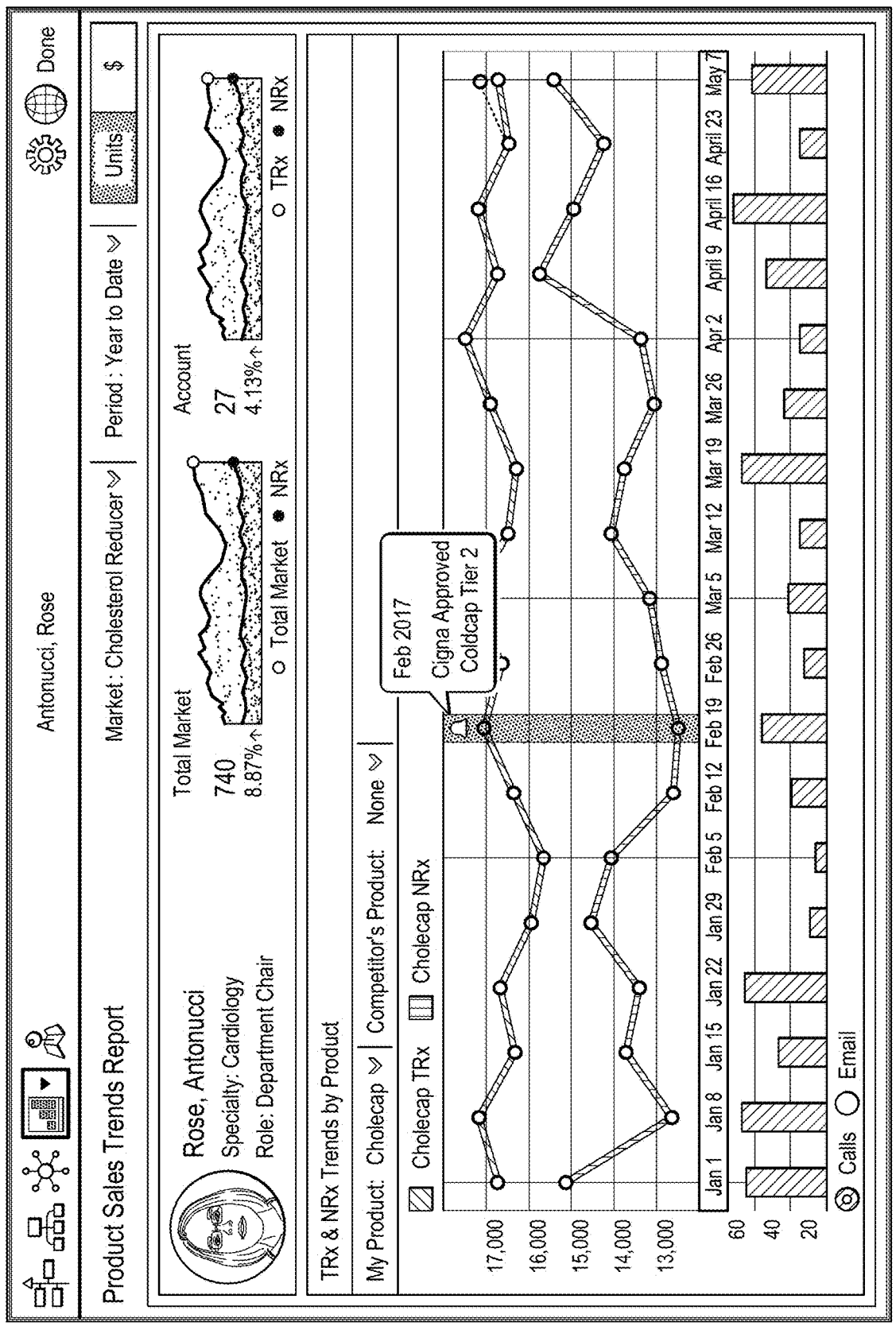
Figure 10:
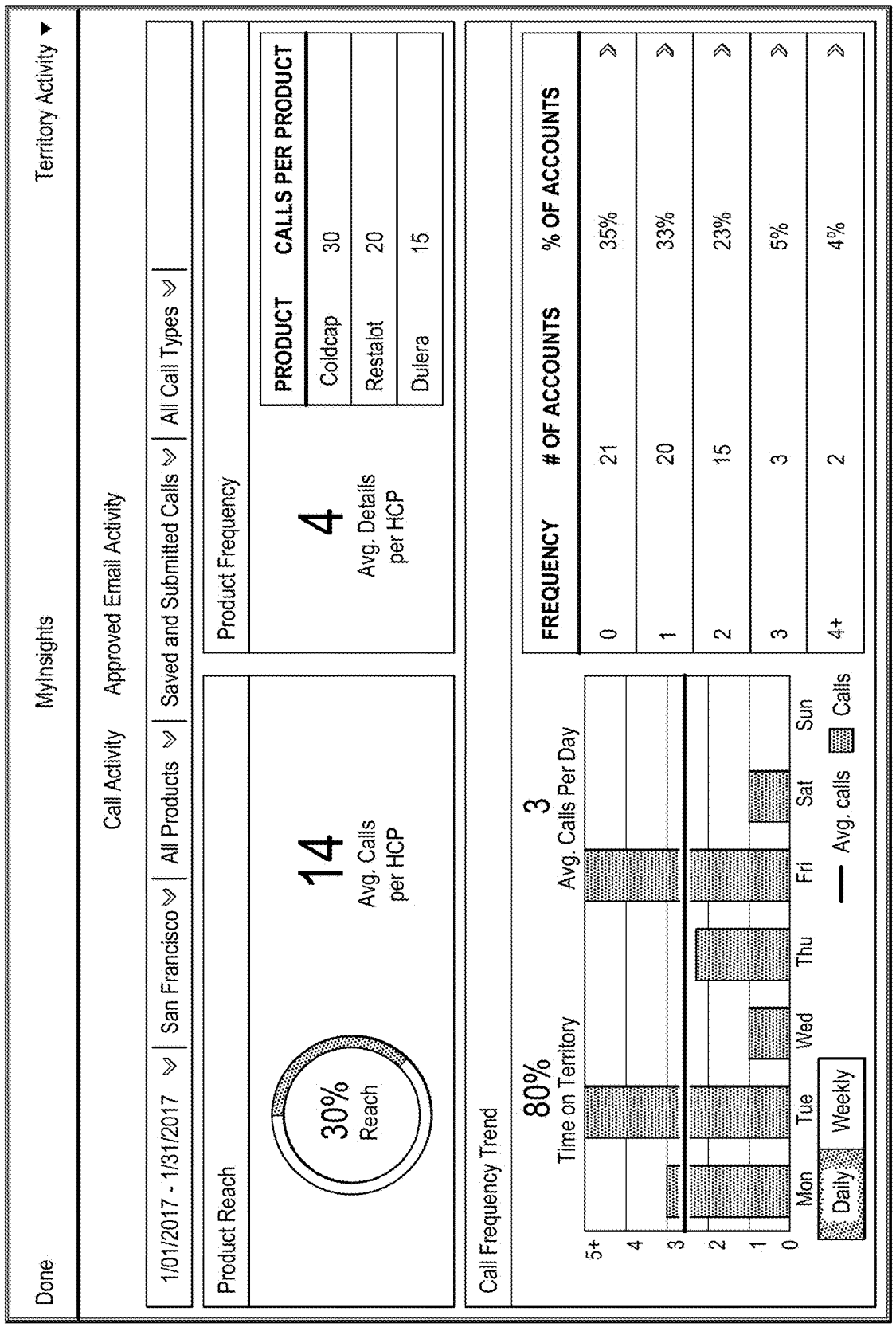
Figure 11:
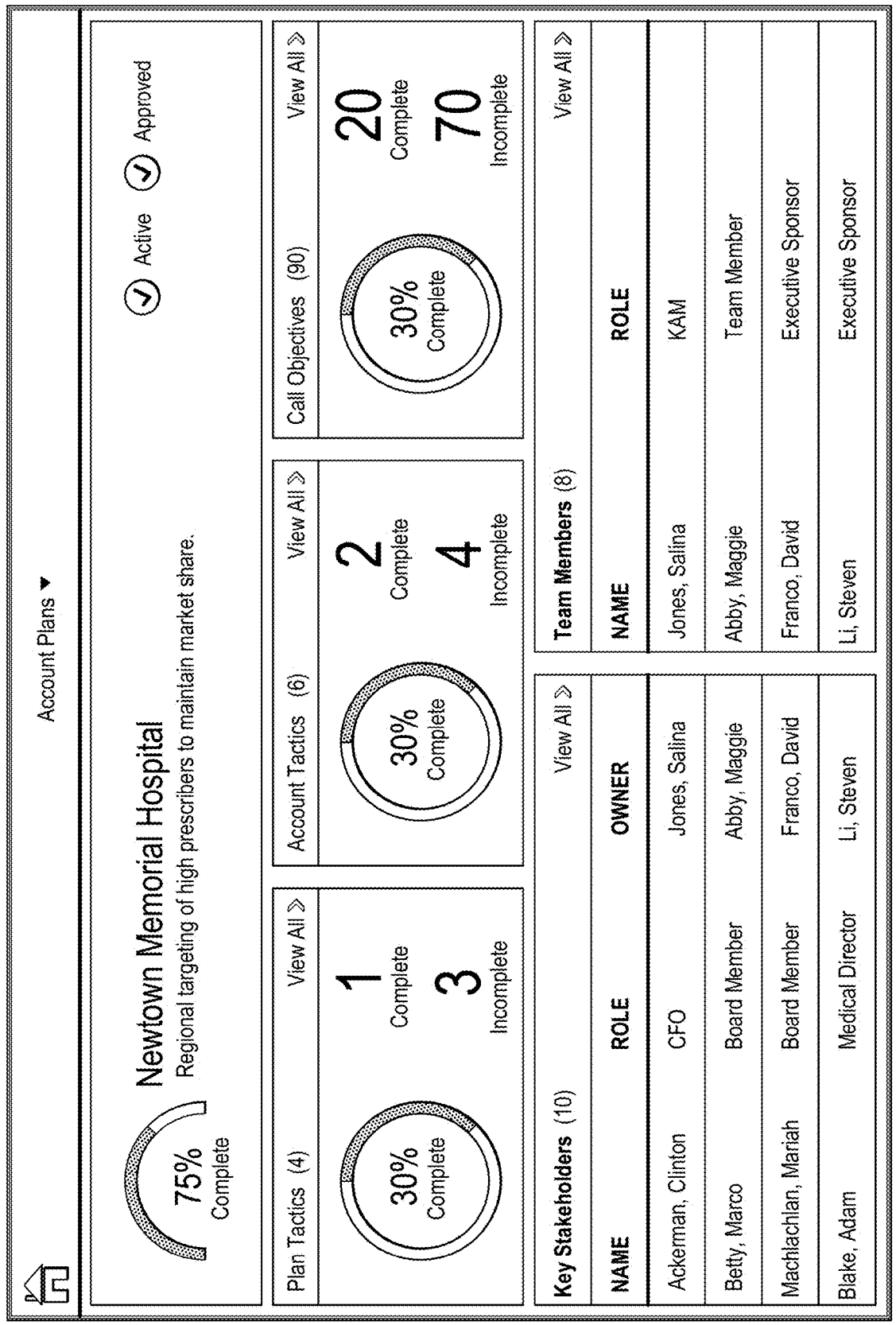
Figure 13:
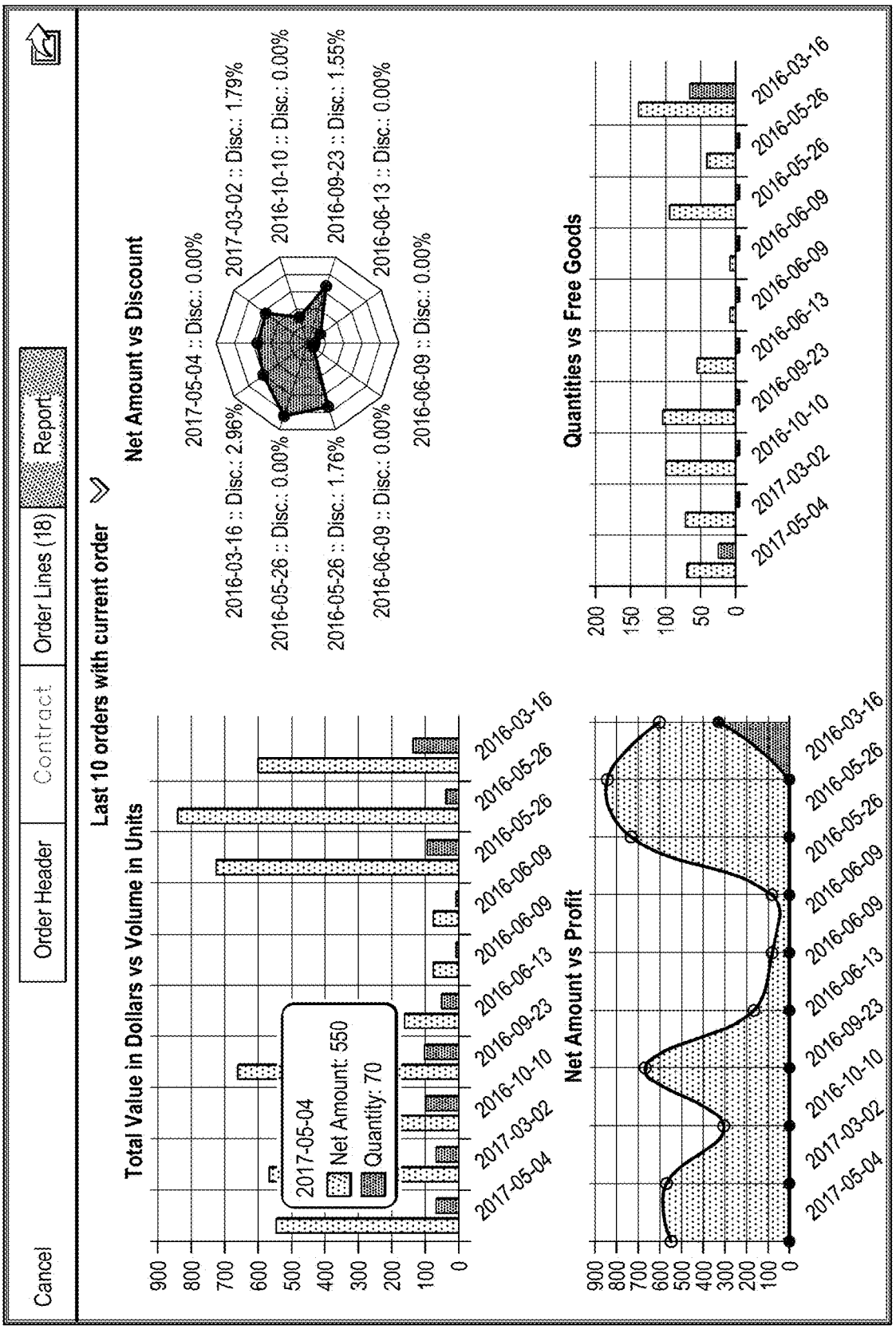

At 507, the user may configure the layout of a custom report. In one implementation, a number of layouts may be displayed by the data visualization controller 134 so that the user can select. Each of the layouts may include a selected set of data fields (e.g., a doctor's name, contact information, and license information), display the data in various formats (e.g., a pie chart, bar chart, donut chart, histogram, line chart, or scatter plot), and arrange the data in various patterns on the user interface. FIGS. 8 to 13 illustrate examples of the custom reports. Specifically, FIG. 8 illustrates an example of a user's call summary, which shows information about calls and samples. FIG. 9 illustrates an example of a product sales trend report, which shows a doctor's name, picture, specialty and product sales trend. FIG. 10 illustrates an example of a user's activity report, including call activities and email activities. FIG. 11 illustrates an example of an account plan, which shows a user's plan tactics, account tactics, and call objectives. FIG. 12 illustrates an example of a KOL profile. FIG. 13 illustrates an example of an order report.

At 509, a data visualization interface may be provided to generate the custom report according to the user configuration of the custom report layout. The data visualization interface may have HTML for specifying the CRM data to be displayed on the custom report and their location on the custom report according to the user configuration.

The data visualization interface may also have embedded JavaScript for specifying the objects and fields users want to query to obtain the CRM data from the customer management relationship subsystem 132 to fill up the custom report.

In one implementation, a number of templates of the data visualization interface may be provided as out of the box options, and the user may customize the templates by editing the HTML.

In one implementation, instead of selecting an out of the box template, the user may build a template himself/herself. The user may take a blank HTML file and write their own HTML. The user may also select methods from a data access library, e.g., the data access library 603 described below, to build their own template of the data visualization interface.

In one implementation, a user interface may be displayed by the data visualization controller 134 for the user to customize the custom report. A number of windows may be displayed for the user to select the type of data to be displayed on the custom report, and the location, format and pattern that the data will be displayed.

In one implementation, the data visualization interface may be a webpage. In one implementation, the data visualization interface may be an iFrame. In one implementation, the data visualization interface may be a Webview.

At 511, the user may search the CRM subsystem 132 for data related to a doctor, e.g., Dr. John Smith. The search result may be returned, e.g., by the CRM server 131.

At 513, it may be determined if the user has selected the custom report, e.g., by the data visualization controller 134. In one implementation, the user may set the custom report as the default view.

If not, at 515, a traditional CRM account screen 1400 with a number of data fields, as shown in FIG. 14, may be displayed by the CRM server 131.

If the user has selected the custom report, at 517, the layout of the custom report may be determined for the user. If the user has not selected a custom report layout, a default layout may be used. The custom report may be used to visualize part or all data on the account record in the style the user selected or the default layout configured. It may also visualize data on related objects. Instead of a list of records, the custom report may have areas to display account details, a photo of the doctor, chart of basic activities (e.g., if they call or email, and the last week of sales). When these areas are filled, the custom report may help the user to understand who the doctor is and his/her activities, as shown in FIGS. 8 to 13. Rather than a data entry heavy CRM account screen, the custom report may be an account level report, or a sales dashboard.

In one implementation, the JavaScript embedded in the data visualization interface may query the CRM subsystem 132 through an application programing interface ("API").

In one implementation, the user may select methods to use from the data access library to interact with the API.

When there is a child application, one application that lives within another installed application, the child application usually communicates through the API provided by the parent application to a data source inside the parent application or external to and exposed through the parent application. Should this child application live within multiple parent applications that provide potentially distinct APIs, the child application would contain multiple pathways through the logic in the application to accommodate these differences in the parent application APIs.

The data visualization of the present invention may facilitate the creation of custom content for data from various platforms, e.g., iOS, Windows, and the browser for Salesforce online. The data visualization controller 134 of the present invention may be integrated as a portion of iOS, Windows Mobile, or Salesforce web applications, and live as a child application within these parent applications. In order to make convenient use of the CRM data, whether it is available through network calls or locally within the parent application, the data access library may expose an API for interacting with the CRM data.

In one implementation, the CRM subsystem 132 may use the Salesforce CRM. The two distinct data sources, the client database 122 and the Salesforce online application data sources, require two different implementations to accomplish the same end effect—a unified API used to communicate with different parent applications. The "online" implementation is the implementation that lives within the Salesforce online web application. The "offline" implementation is the implementation that lives within a native app such as an iOS application or a Windows Mobile application.

Figure 6:
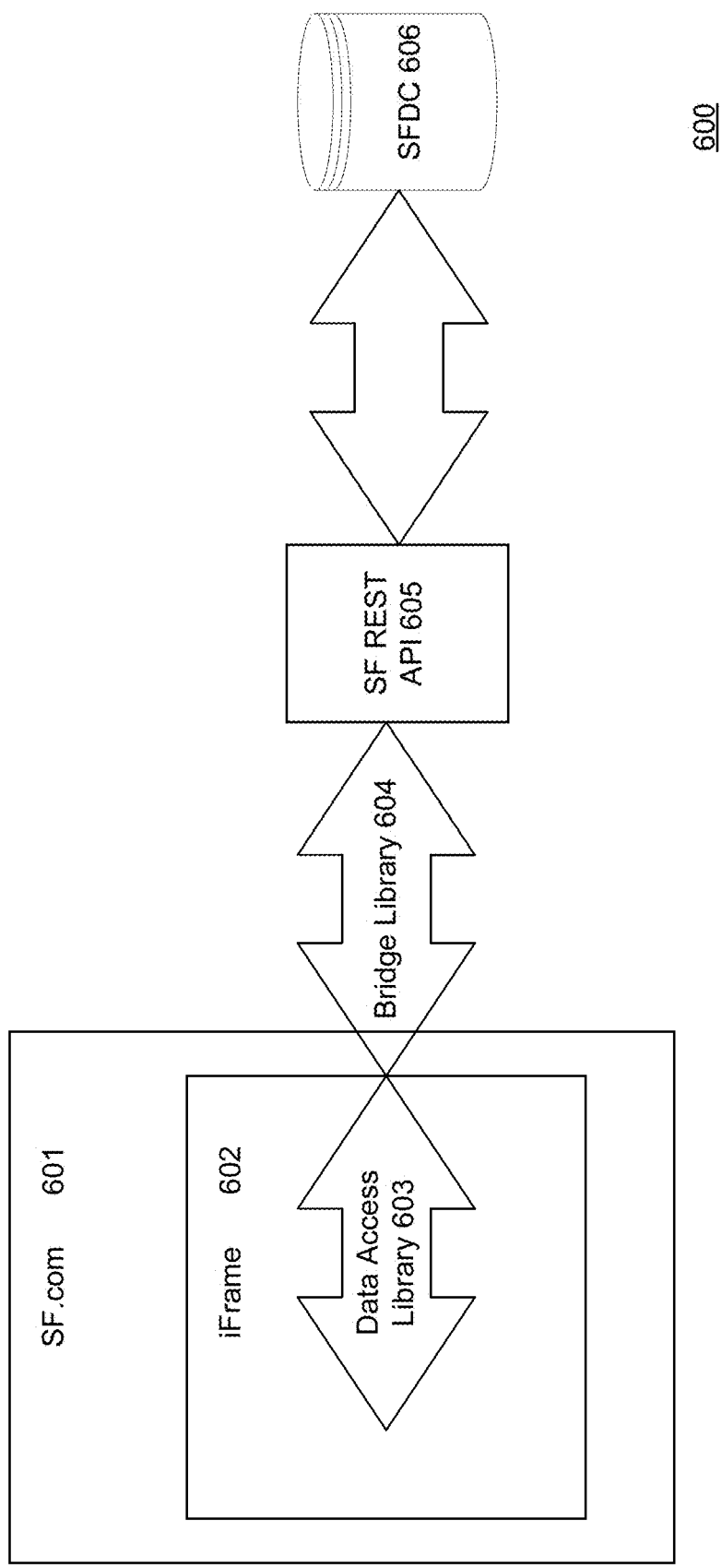
FIG. 6 illustrates an example application programming interface ("API") according to one embodiment of the present invention.

For the online implementation, as shown in FIG. 6, the communication pathway from the data visualization interface code (e.g., the JavaScript code in the data visualizing interface) to the SFDC 606 may incorporate three libraries. The JavaScript code may first make calls to the data access library 603 at 519. These calls are the exact same calls they would make when the report is running inside of a CRM native iOS or Windows application.

After the JavaScript code makes a call to the data access library 603, at 521, the data access library 603 may query objects and fields in the CRM subsystem 132, starting with posting a message from within the iFrame where the report is rendered, to the parent page via the window.postMessage( ) function provided by the web browser vendor. The Bridge Library 604 instantiated within the customized Salesforce page is subscribed to and listening for these messages. When the Bridge Library 604 receives a message from the data access library 603, the corresponding and appropriate functions are called within the Salesforce Force library, which is incorporated in the Bridge Library files, to return the data requested by the JavaScript code through queries to the Salesforce REST API 605. The Bridge Library 604 normalizes the data returned from the Salesforce API 605 in order to give it the same shape as the data that would be returned in the Offline Implementation. At 523, the data requested by the Javascript code may be returned to the data visualization interface from the CRM subsystem 132.

Figure 7:
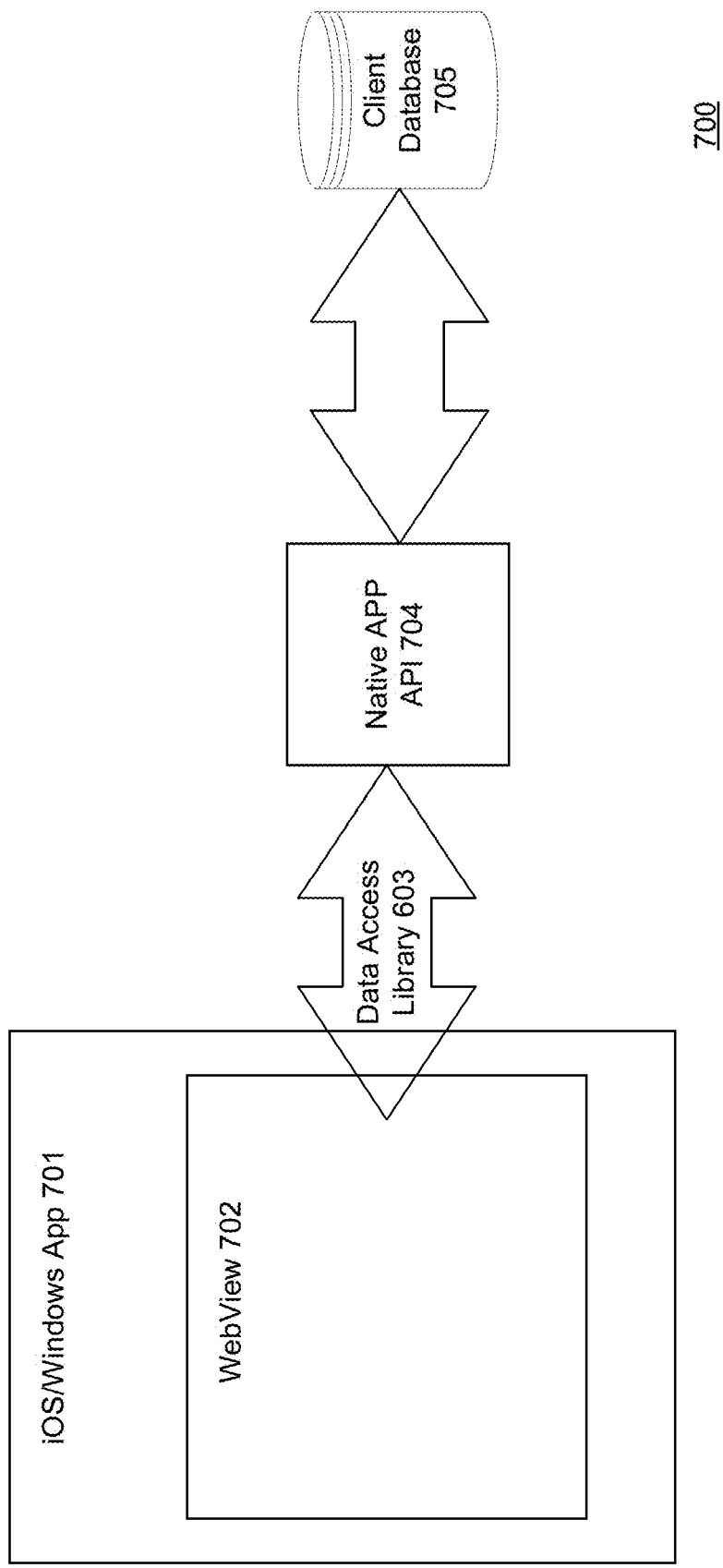
FIG. 7 illustrates an example API according to one embodiment of the present invention.

For the offline implementation, as shown in FIG. 7, the custom report within the native application, is rendered within a Webview 702. This is a web browser within the native application. In order for the report within the Webview to communicate with the parent application, a unique use of the url/location of the Webview 702 has been devised where strings with a certain signature posted to the location of the Webview 702 are captured while the navigation of the Webview 702 is cancelled. That string contains commands and queries that can run against the local data source. This cycle of posting strings to the location of the Webview 702 and the native application posting the data back to the Webview 702 are completed by using unique callbacks for each query. This cycle of queries and callbacks is facilitated by the data access library 603. Calls and returns are normalized to be the same as the calls and returns in the Online implementation.

The data access library 603 is a unified API which may be used to communicate with a parent application, whether the device is in an offline state (disconnected from the internet) or online state (connected to the internet), from within the parent application—the parent application being an application installed on a device or an application running within a web browser.

In one implementation, the CRM data may be returned to the data visualization interface in JSON format.

At 531, the JavaScript code may place the CRM data at the right place on the custom report, using the HTML to render the custom report.

Figure 15A:
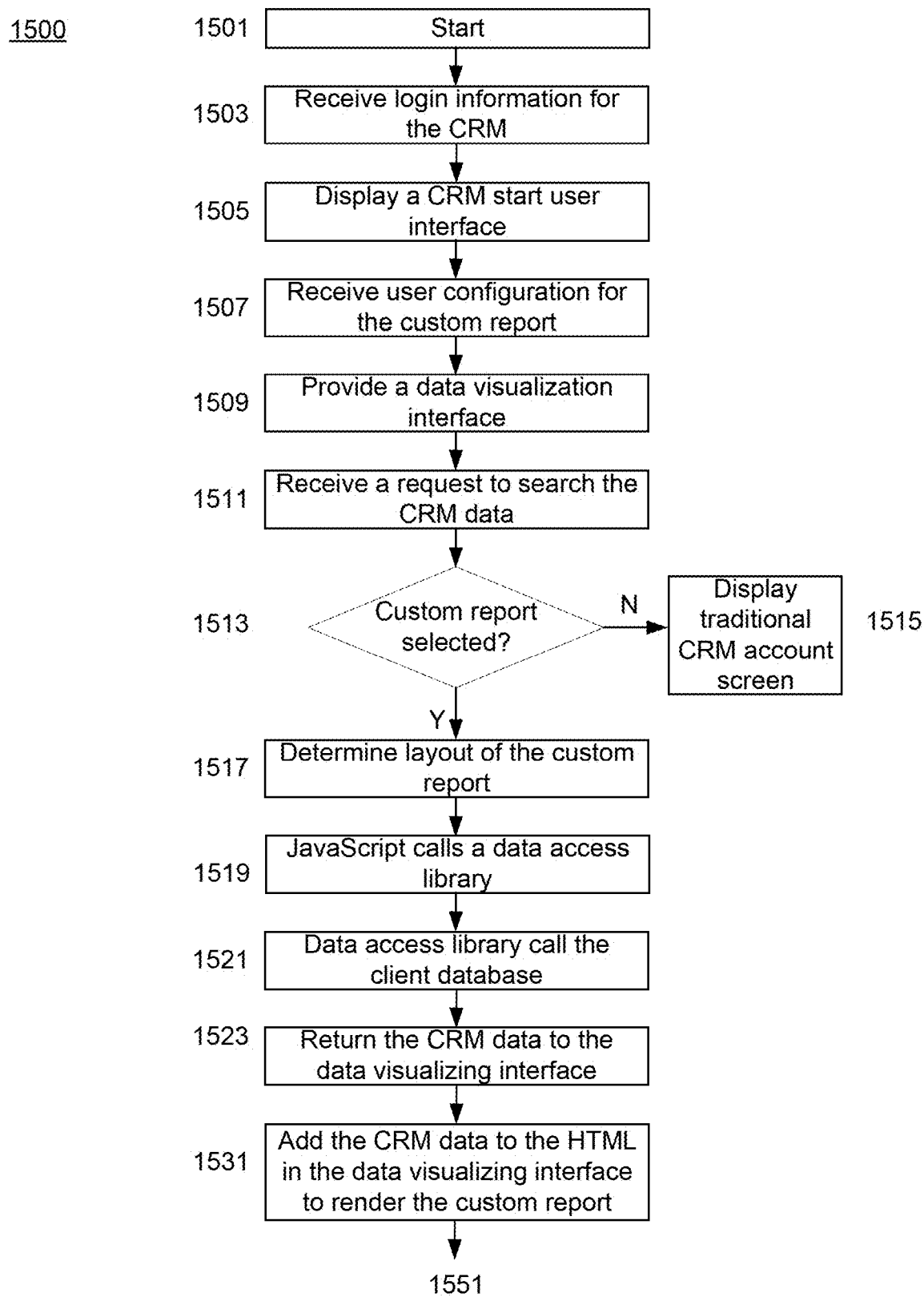
FIGS. 15A and 15B illustrate an example flowchart of a method for displaying data from a data storage system according to one embodiment of the present invention.
Figure 15B:
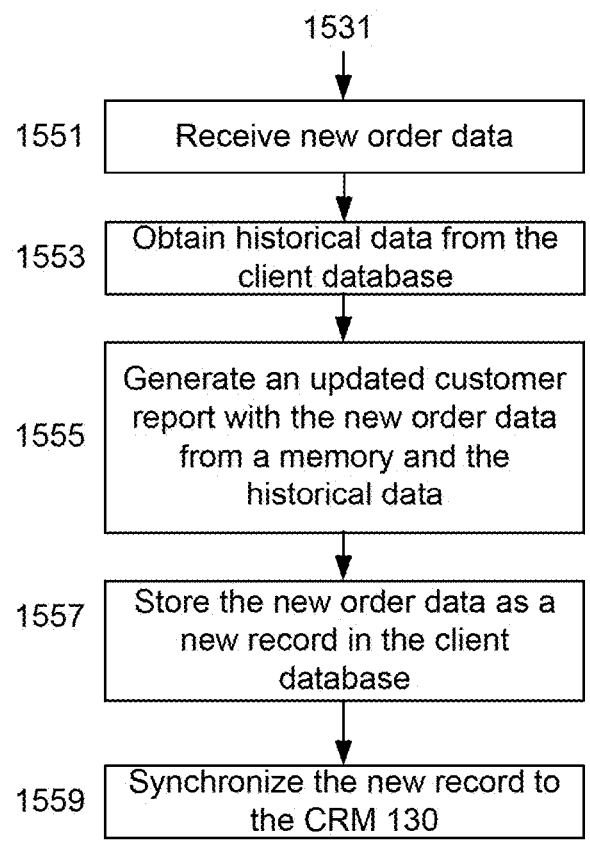

In one embodiment, the customer report may be updated with new data before the data is stored in the CRM 130 and persisted. FIGS. 15A and 15B illustrate an example flowchart of a method for visualizing live data update to a CRM system according to one embodiment of the present invention. The process may be carried out on a user computing device even when connection to the network 150 is unavailable. In one example, during a new order capture, a user (e.g., a sales representative) may enter data for this new order before its close to see how the new order can impact the product sales trend. The new order is not stored in the CRM 130, or the client database 122 when the network 150 is unavailable, and persisted yet.

At 1503, a user may login to the client application 121 when the network 150 is unavailable, or the CRM 130.

At 1505, a start user interface for the CRM 130 may be displayed in response, by the client application 121.

At 1507, the user may configure the layout of a custom report. In one implementation, a number of layouts may be displayed by a client data visualization controller 123 in the client application 121 so that the user can select. Each of the layouts may include a selected set of data fields (e.g., a doctor's name, contact information, and license information), display the data in various formats (e.g., a pie chart, bar chart, donut chart, histogram, line chart, or scatter plot), and arrange the data in various patterns on the user interface, as shown in FIGS. 8 to 13.

At 1509, a data visualization interface may be provided by the client data visualization controller 123 to generate the custom report according to the user configuration of the custom report layout. The data visualization interface may have HTML for specifying the CRM data to be displayed on the custom report and their location on the custom report according to the user configuration.

The data visualization interface may also have embedded JavaScript for specifying the objects and fields users want to query to obtain the CRM data from the CRM subsystem 132 or the client database 122 to fill up the custom report.

In one implementation, a number of templates of the data visualization interface may be provided as out of the box options, and the user may customize the templates by editing the HTML.

In one implementation, instead of selecting an out of the box template, the user may build a template himself/herself. The user may take a blank HTML file and write their own HTML. The user may also select methods from a data access library, e.g., the data access library 603, to build their own template of the data visualization interface.

In one implementation, a user interface may be displayed by the client data visualization controller 123 for the user to customize the custom report. A number of windows may be displayed for the user to select the type of data to be displayed on the custom report, and the location, format and pattern that the data will be displayed.

In one implementation, the data visualization interface may be a webpage. In one implementation, the data visualization interface may be an iFrame. In one implementation, the data visualization interface may be a Webview.

At 1511, the user may search the CRM data related to the product sales trend, and the CRM data could be from the CRM subsystem 132, or the client database 122 when the network 150 is unavailable. The search result may be returned, e.g., by the client data visualization controller 123.

At 1513, it may be determined if the user has selected the custom report, e.g., by the client data visualization controller 123. In one implementation, the user may set the custom report as the default view.

If not, at 1515, a traditional CRM account screen 1400 with a number of data fields, as shown in FIG. 14, may be displayed by the client application 121.

If the user has selected the custom report, at 1517, the layout of the custom report may be determined for the user. If the user has not selected a custom report layout, a default layout may be used. The custom report may be used to visualize part or all data related to the product sales trend in the style the user selected or the default layout configured. It may also visualize data on related objects. Instead of a list of records, the custom report may have areas to display bars charts or waveforms to show the product sales trend, as shown in FIG. 9. When these areas are filled, the custom report may help the user to understand the product sales trend. Rather than a data entry heavy CRM account screen, the custom report may be a sales dashboard.

In one implementation, the JavaScript embedded in the data visualization interface may query the CRM data, e.g., in CRM subsystem 132 or client database 122, through a data access library 603 application programing interface ("API") at 1519.

In one implementation, the user may select methods to use from the data access library to interact with the API.

When there is a child application, one application that lives within another installed application, the child application usually communicates through the API provided by the parent application to a data source inside the parent application or external to and exposed through the parent application. Should this child application live within multiple parent applications that provide potentially distinct APIs, the child application would contain multiple pathways through the logic in the application to accommodate these differences in the parent application APIs.

The data visualization of the present invention may facilitate the creation of custom content for data from various platforms, e.g., iOS, Windows, and the browser for Salesforce online. The client data visualization controller 123 of the present invention may be integrated as a portion of iOS, Windows Mobile, or Salesforce web applications, and live as a child application within these parent applications. In order to make convenient use of the CRM data, whether it is available through network calls or locally within the parent application, the data access library may expose an API for interacting with the CRM data.

In one implementation, the CRM subsystem 132 may use the Salesforce™ CRM. The two distinct data sources, the client database 122 and the Salesforce online application data sources, require two different implementations to accomplish the same end effect—a unified API used to communicate with different parent applications. The "online" implementation is the implementation that lives within the Salesforce online web application. The "offline" implementation is the implementation that lives within a native app such as an iOS application or a Windows Mobile application.

For the offline implementation, as shown in FIG. 7, the custom report within the native application, is rendered within a Webview 702. This is a web browser within the native application. In order for the report within the Webview to communicate with the parent application, a unique use of the url/location of the Webview 702 has been devised where strings with a certain signature posted to the location of the Webview 702 are captured while the navigation of the Webview 702 is cancelled. That string contains commands and queries that can run against the local data source. This cycle of posting strings to the location of the Webview 702 and the native application posting the data back to the Webview 702 are completed by using unique callbacks for each query. This cycle of queries and callbacks is facilitated by the data access library 603 at 1521. Calls and returns are normalized to be the same as the calls and returns in the Online implementation.

The data access library 603 is a unified API which may be used to communicate with a parent application, whether the device is in an offline state (disconnected from the internet) or online state (connected to the internet), from within the parent application—the parent application being an application installed on a device or an application running within a web browser.

In one implementation, the CRM data may be returned to the data visualization interface at 1523, e.g., in JSON format.

At 1531, the JavaScript code may place the CRM data at the right place on the custom report, using the HTML to render the custom report.

At 1551, new order data may be received at a user computing device, e.g., 120*a*. The new order data may be stored in a memory, e.g., memory 124, which may be a volatile memory, in the user computing device before the workflow for creating a new order is completed.

At 1553, corresponding historical data may be obtained as a benchmark. The historical data may be obtained from the online persisted database CRM subsystem 132 when it is accessible by the server process, or the offline persisted client database 122 by the client application 121.

At 1555, an updated customer report reflecting the new order data from the memory 124 in the user computing device may be generated and displayed. In one implementation, the updated customer report may be displayed in a separate window, and the user may switch between the historical customer report and the updated customer report. In one implementation, the updated customer report may be displayed over the historical customer report, as shown in FIG. 9B, so that the user can compare the product sales trend before and after the new deal.

If the user is happy with the new order, he may complete the workflow for creating a new order, and the record may be stored in the client database 122 at 1557.

At 1559, the new order data may be synchronized to the CRM subsystem 132.

Thus, user can see real time update before the new order data is stored in the CRM subsystem 132, even when the user computing device is offline.

In one embodiment, content of the custom report may be edited and the new data may be written back to the CRM 130. One or more methods may be added to the data access library 603 in FIG. 6, which may be a JavaScript library, to facilitate communication between content of the custom report and client application 121 or the CRM 130. In one embodiment, the data access library 603 may run in the browser 123. In one embodiment, a "new record" method and an "update record" method may be added to the data access library 603, so as to allow the updated content to be written back to the client database 122 or the CRM subsystem 132.

Figure 16A:
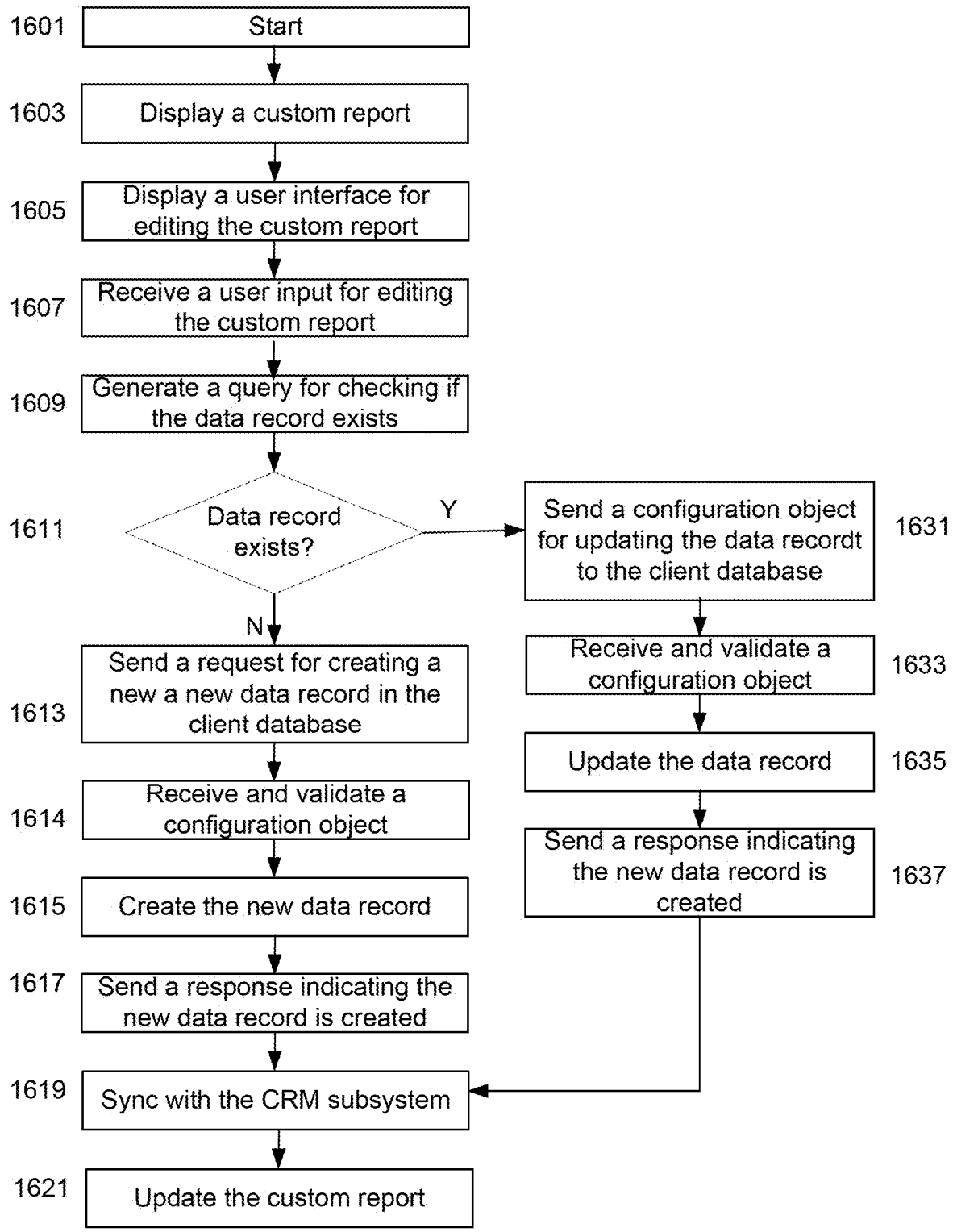
FIG. 16A illustrates an example flowchart of a method for editing data in the CRM system via a custom report according to one embodiment of the present invention.

FIG. 16A illustrates an example flowchart of a method for editing data in the CRM system via a custom report with the client application 121 according to one embodiment of the present invention. This method may be used when the user device 120a is online or offline. The process may start at 1601.

At 1603, a custom report generated with the process shown in FIG. 5 and data from the client database 122 may be displayed. The custom report may be 800 shown in FIG. 8.

Figure 17A:
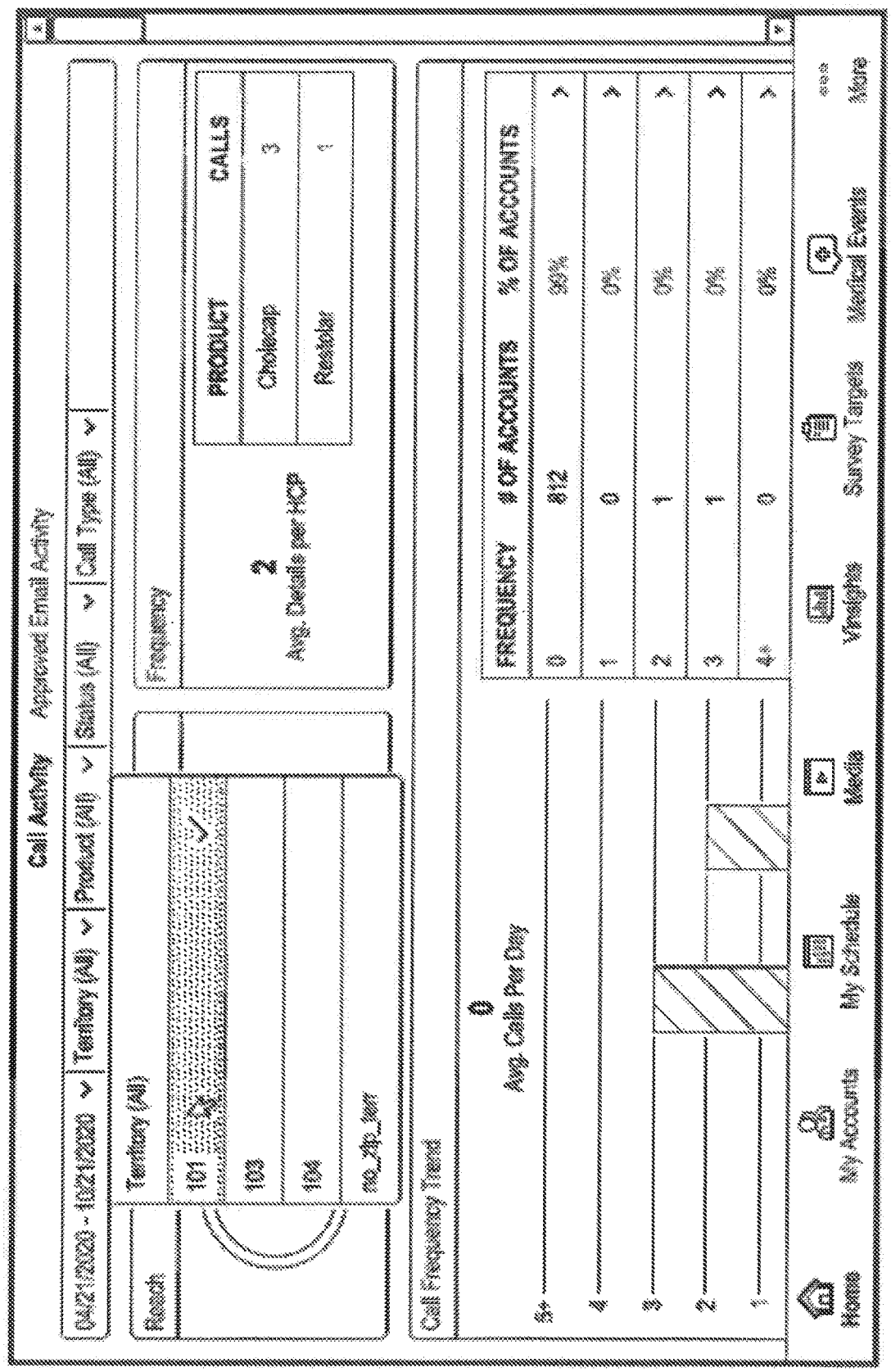
FIGS. 17A and 17B each illustrates an example user interface for editing data in the CRM system via a custom report according to one embodiment of the present invention.
Figure 17B:
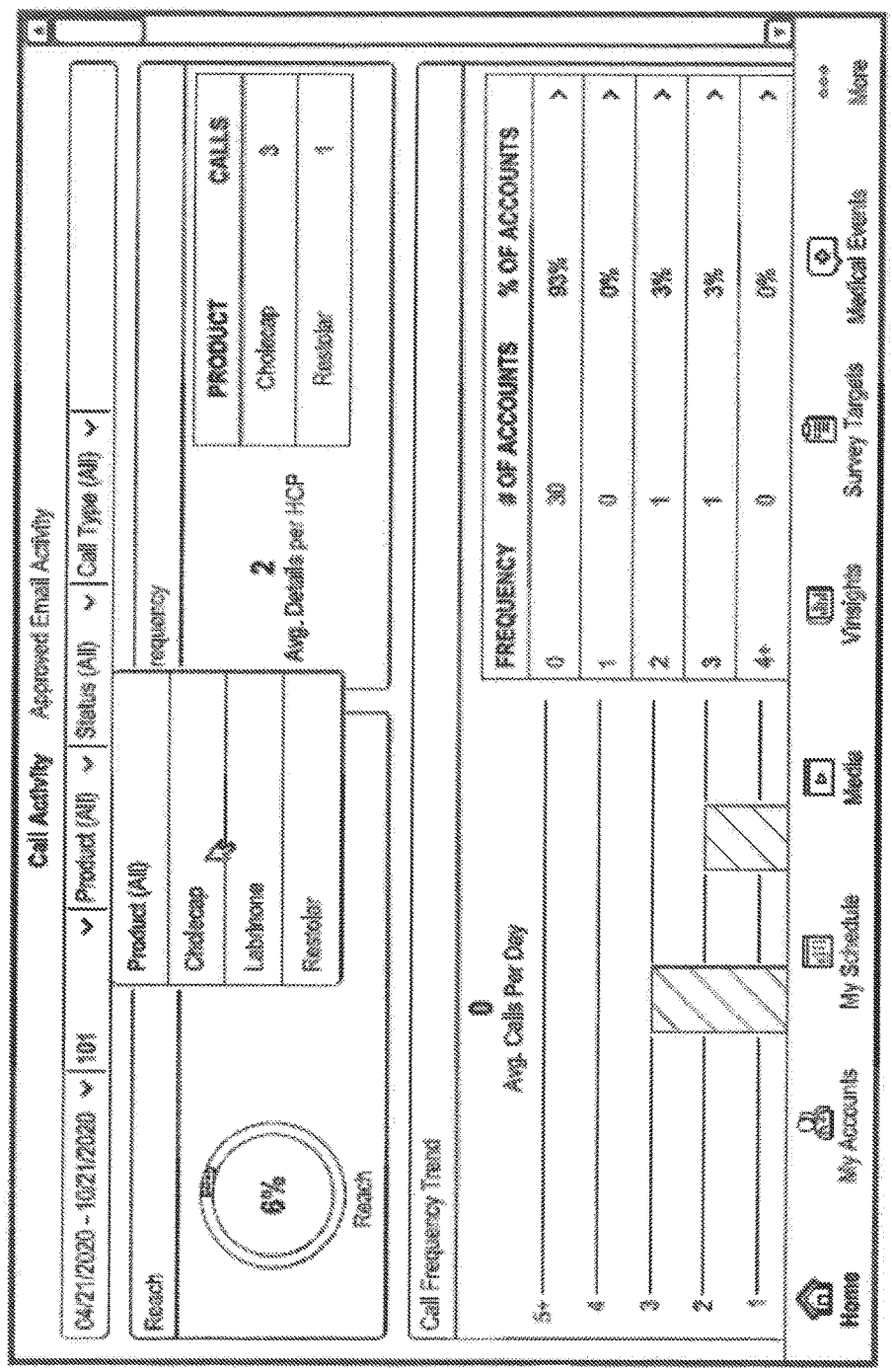

At 1605, a user interface 1701 for editing the custom report may be displayed by the client application 121 in response to a user request. In one embodiment, the user interface 1701 may be a pop-up window over the custom report 800, as shown in FIG. 17A or 17B. In one embodiment, the user interface 1701 may have one or more filters for selecting the data to be edited, e.g., territory, or product.

At 1607, a user input for editing data in the custom report 800 may be received on the user interface 1701.

At 1609, a query in JavaScript may be generated in the data access library 603 and sent to the client database 122 by the client application 121 to check if the record involved in the data editing exists in the client database 122. The query may have information for defining the record involved in the data editing.

At 1611, a response in JavaScript may be received from the client database 122. If the client database 122 has such a record, the process may proceed to 1631 to update the record.

If the client database 122 does not have such a record, a new record needs to be created, and the "new record" method in the data access library 603 may be used. The new record may be, e.g., add a new dynamic attribute to an object, or add a new product matrix. At 1613, a request in JavaScript for creating a new data record may be sent from the client application 121 to the client database 122. The request may have a configuration object which defines the name of the record to be created, data fields and field values. If no field is going to be filled, an empty record may be created.

At 1614, the configuration object may be received at the client database 122 and validated.

At 1615, the new data record may be created in the client database 122.

At 1617, a response in JavaScript may be sent from the client database 122 to the client application 121 to indicate if the new record is created successfully.

If the new record is created successfully, it may be synced up to the CRM subsystem 132 at 1619 during the next synchronization between the client database 122 and the CRM subsystem 132. Otherwise, the process may return to 1615.

At 1621, the custom report displayed at 1603 may be updated with the new data through the process shown in FIG. 5.

If the response at 1611 indicates that the client database 122 has such a record, the "update record" method in the data access library 603 may be used. At 1631, a configuration object for updating the data record may be sent from the client application 121 to the client database 122 via a JavaScript message. The configuration object may have the name of the record to update, the new value, and ID of the record to update.

At 1633, the configuration object may be received at the client database 122, and validated.

At 1635, the data record identified in the configuration object in the client database 122 may be updated according to the configuration object.

At 1637, a response in JavaScript may be sent from the client database 122 to the client application 121 to indicate if the data record is updated successfully.

If the data record is updated successfully, the process may proceed to 1619. Otherwise, the process may return to 1635.

Figure 16B:
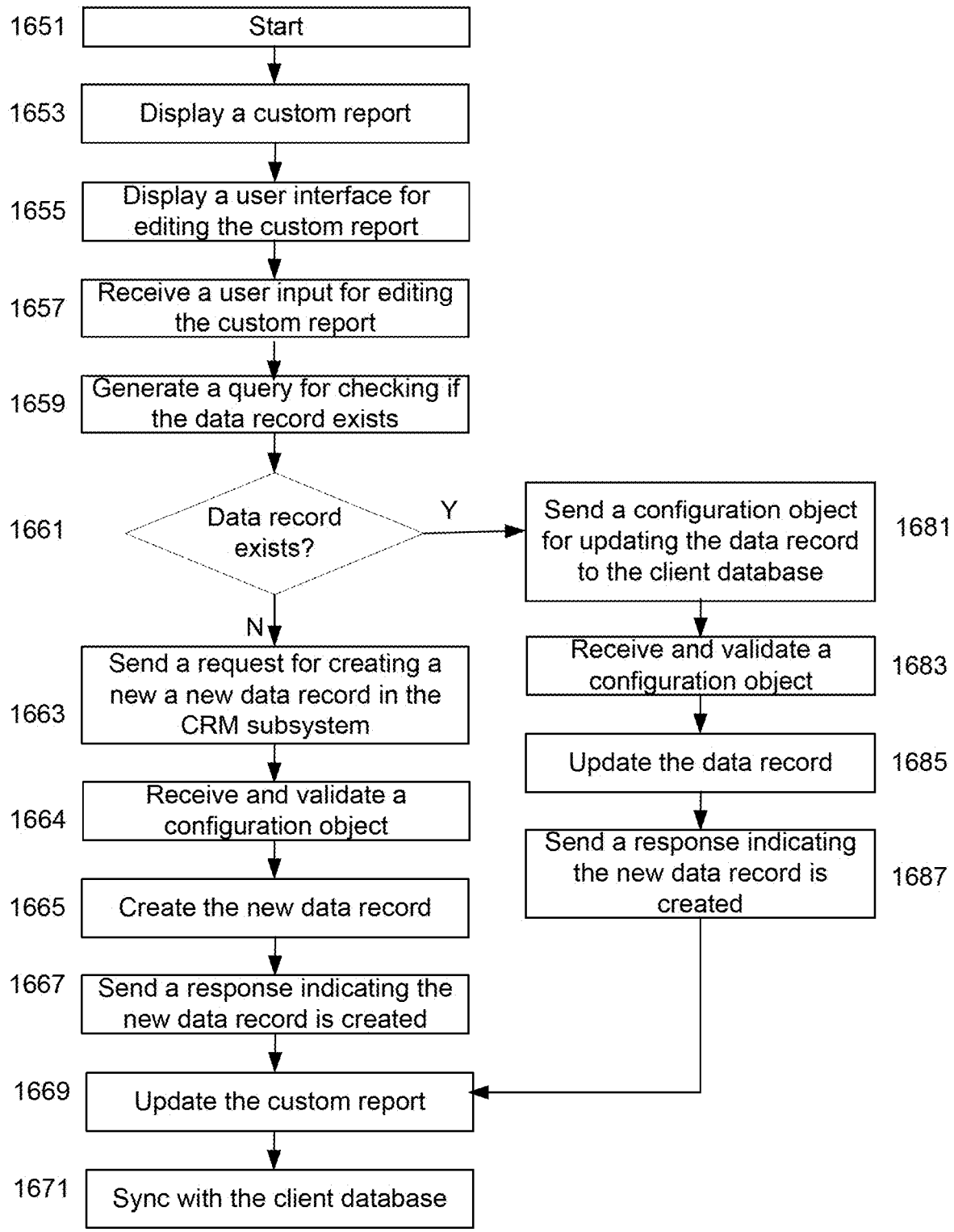
FIG. 16B illustrates an example flowchart of a method for editing data in the CRM system via a custom report according to one embodiment of the present invention.

FIG. 16B illustrates an example flowchart of a method for editing data directly in the CRM subsystem 132 via a custom report according to one embodiment of the present invention. This method may be used when the user device 120a is online. The process may start at 1651 when a user is logged onto the CRM 130 via the browser 123.

At 1653, a custom report generated with the process shown in FIG. 5 and data from CRM subsystem 132 may be displayed. The custom report may be 800 shown in FIG. 8.

At 1655, a user interface 1701 for editing the custom report may be displayed by the CRM server 131 in response to a user request. In one embodiment, the user interface 1701 may be a pop-up window over the custom report 800, as shown in FIG. 17A or 17B. In one embodiment, the user interface 1701 may have one or more filters for selecting the data to be edited, e.g., territory, or product.

At 1657, a user input for editing data in the custom report 800 may be received on the user interface 1701.

At 1659, a query in JavaScript may be generated in the data access library 603 and sent to the CRM 130 by the browser 123 to check if the record involved in the data editing exists in the CRM subsystem 132. The query may have information for defining the record involved in the data editing.

At 1661, a response in JavaScript may be received from the CRM 130. If the CRM subsystem 132 has such a record, the process may proceed to 1681 to update the record.

If the CRM subsystem 132 does not have such a record, a new record needs to be created, and the "new record" method in the data access library 603 may be used. At 1663, a request in JavaScript for creating a new data record may be sent from the browser 123 to the CRM 130. The request may have a configuration object which defines the name of the new record to be created, data fields and field values. If no field is going to be filled, an empty record may be created.

At 1664, the configuration object may be received at the CRM 130 and validated.

At 1665, the new data record may be created in the CRM subsystem 132.

At 1667, a response in JavaScript may be sent from the CRM 130 to the browser 123 to indicate if the new record is created successfully.

If the new record is created successfully, at 1669, the custom report displayed at 1653 may be updated with the new data through the process shown in FIG. 5. Otherwise, the process may return to 1665.

The updated data may be synced down to the client database at 1671 during the next synchronization between the client database 122 and the CRM subsystem 132.

If the response at 1661 indicates that the CRM subsystem 132 has such a record, the "update record" method in the data access library 603 may be used. At 1681, a configuration object for updating the data record may be sent from the browser 123 to the CRM 130 via a JavaScript message. The configuration object may have the name of the record to update, the new value, and ID of the record to update.

At 1683, the configuration object may be received at the CRM 130, and validated.

At 1685, the data record in the CRM subsystem 132 may be updated according to the configuration object.

At 1687, a response in JavaScript may be sent from the CRM 130 to the browser 123 to indicate if the data record is updated successfully.

If the data record is updated successfully, the process may proceed to 1669. Otherwise, the process may return to 1685.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

In this specification, the term "software" is meant to include firmware residing in read-only memory or applications stored in magnetic storage, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs. Examples of computer programs or computer code include machine code, for example is produced by a compiler, and files including higher-level code that are executed by a computer, an electronic component, or a microprocessor using an interpreter.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more.

What is claimed is:

1. A computer-implemented method for editing data in a data storage system, the method comprising:
enabling generation of a data visualization interface for rendering a first custom report according to previously received user configuration, wherein the user configuration comprises a first type of data to be displayed at a first location on the first custom report and a second type of data to be displayed at a second location on the first custom report; wherein the first type of data and the second type of data are obtained from the data storage system; wherein the data visualization interface comprises instructions in a markup language for specifying the first type of data, the first location, the second type of data, and the second location, and instructions in a second programing language for obtaining the first type of data and the second type of data from the data storage system;
receiving the instructions in the second programing language from the data visualization interface at an application programming interface ("API");
sending an API call to the data storage system to obtain the first type of data and the second type of data;
receiving the first type of data and the second type of data at the data visualization interface;
rendering the first custom report, wherein the first custom report is based on the first type of data, the first location, the second type of data and the second location;
displaying the first custom report; and
receiving a request for editing the first type of data obtained from the data storage system and displayed on the custom report, wherein the first type of data is previously stored in the data storage system, and wherein the request for editing the first type of data is received on a user interface for editing the first custom report.

2. The method of claim 1, wherein the makeup language is HyperText Markup Language ("HTML").

3. The method of claim 1, wherein the second programming language is JavaScript.

4. The method of claim 1, further comprising: displaying a first user interface for editing the first type of data displayed on the custom report by a client application in a user computing device.

5. The method of claim 4, wherein the first user interface is a pop-up window over the custom report.

6. The method of claim 4, further comprising: receiving a first user input for editing the first type of data displayed on the custom report.

7. The method of claim 6, further comprising: generating a first query in a data access library for checking if a new data record needs to be created in a storage device in a user computing device to edit the first type of data displayed on the custom report in response to the first user input.

8. The method of claim 7, further comprising: sending a request for creating the new data record to the storage device in the user computing device.

9. The method of claim 8, wherein the request for creating the new data record is in JavaScript.

10. The method of claim 8, wherein the request for creating the new data record comprises information for defining the new data record to be created.

11. The method of claim 7, further comprising: creating the new data record in the storage device in the user computing device.

12. The method of claim 7, further comprising: sending a response from the storage device in the user computing device to the client application in the user computing device to report creation of the new data record.

13. The method of claim 7, further comprising: uploading the new data record to the data storage system over a network.

14. The method of claim 7, further comprising: updating the custom report with the new data record.

15. The method of claim 6, further comprising: determining that the first user input for editing the first type of data displayed on the custom report is for updating an existing data record.

16. The method of claim 15, further comprising: sending a request for updating the existing data record to the storage device in the user computing device.

17. The method of claim 16, wherein the request for updating the existing data record comprises information for defining the existing data record to the updated.

18. The method of claim 15, further comprising: updating the existing data record in the storage device in the user computing device.

19. The method of claim 15, further comprising: sending a response from the storage device in the user computing device to the client application in the user computing device to report that the existing data record has been updated.

20. The method of claim 6, further comprising: generating a second query in a data access library for checking if a new data record needs to be created in the data storage system for editing the first type of data displayed on the custom report in response to the first user input.

21. The method of claim 20, further comprising: sending a request for creating the new data record to the data storage system.

22. The method of claim 20, further comprising: creating the new data record in the data storage system.

23. The method of claim 20, further comprising: updating the custom report with the new data record.

24. The method of claim 20, further comprising: determining that the second query for editing the first type of data displayed on the custom report is for updating an existing data record in the data storage system.

25. The method of claim 20, further comprising: sending a request for updating the existing data record to the data storage system from a browser in a user computing device.

26. The method of claim 20, further comprising: updating the existing data record in the data storage system.

* * * * *